(12) United States Patent
Burdzy et al.

(10) Patent No.: US 8,197,990 B2
(45) Date of Patent: Jun. 12, 2012

(54) SEALANT INTEGRATED FUEL CELL COMPONENTS AND METHODS AND SYSTEMS FOR PRODUCING THE SAME

(75) Inventors: Matthew P. Burdzy, South Windsor, CT (US); Brian R. Einsla, Chalfont, PA (US); Kevin J. Welch, Wallingford, CT (US)

(73) Assignee: Henkel Corporation, Rocky Hill, CT (US)

( * ) Notice: Subject to any disclaimer, the term of this patent is extended or adjusted under 35 U.S.C. 154(b) by 987 days.

(21) Appl. No.: 12/161,240

(22) PCT Filed: Jan. 16, 2007

(86) PCT No.: PCT/US2007/001064
§ 371 (c)(1),
(2), (4) Date: Jul. 17, 2008

(87) PCT Pub. No.: WO2007/084472
PCT Pub. Date: Jul. 26, 2007

(65) Prior Publication Data
US 2009/0004551 A1    Jan. 1, 2009

Related U.S. Application Data

(60) Provisional application No. 60/759,380, filed on Jan. 17, 2006.

(51) Int. Cl.
*H01M 2/08* (2006.01)
*H01M 8/02* (2006.01)

(52) U.S. Cl. ............... 429/535; 429/469; 429/510

(58) Field of Classification Search ............ 429/469, 429/508, 509, 510, 535
See application file for complete search history.

(56) References Cited

U.S. PATENT DOCUMENTS

| | | |
|---|---|---|
| 3,159,601 A | 12/1964 | Ashby et al. |
| 3,159,662 A | 12/1964 | Ashby el al. |
| 3,220,972 A | 11/1965 | Lamoreaux |
| 3,516,946 A | 6/1970 | Modie |
| 3,814,730 A | 6/1974 | Karstedt |
| 5,264,299 A | 11/1993 | Krasij et al. |
| 5,837,774 A | 11/1998 | Tarumi et al. |
| 6,057,054 A | 5/2000 | Barton et al. |
| 6,159,628 A | 12/2000 | Grasso et al. |
| 6,165,634 A | 12/2000 | Krasij et al. |
| 6,451,468 B1 | 9/2002 | Adachi |
| 6,451,469 B1 | 9/2002 | Nakamura et al. |
| 6,531,236 B1 * | 3/2003 | Hatoh et al. ............ 429/454 |
| 6,593,020 B1 | 7/2003 | Yoo et al. |

(Continued)

FOREIGN PATENT DOCUMENTS
EP        159477 A1   10/1985

(Continued)

*Primary Examiner* — Stephen J. Kalafut
(74) *Attorney, Agent, or Firm* — James E. Piotrowski; Steven C. Bauman

(57) ABSTRACT

A fuel cell, having improved sealing against leakage, includes a sealant disposed over the peripheral portions a membrane electrode assembly such that the cured sealant penetrates a gas diffusion layer of the membrane electrode assembly. The sealant is applied through liquid injection molding techniques to form cured sealant composition at the peripheral potions of the membrane electrode assembly. The sealant may be thermally cured at low temperatures, for example 130° C. or less, or may be cured at room temperature through the application of actinic radiation.

16 Claims, 5 Drawing Sheets

U.S. PATENT DOCUMENTS

| | | |
|---|---|---|
| 6,649,097 B2 | 11/2003 | Sasaki et al. |
| 6,656,580 B2 | 12/2003 | Woods |
| 6,680,138 B1 | 1/2004 | Honma et al. |
| 6,764,624 B2 | 7/2004 | Saito et al. |
| 6,773,758 B2 | 8/2004 | Yamanaka |
| 6,797,771 B2 * | 9/2004 | Sapper et al. ............ 524/728 |
| 6,864,009 B2 | 3/2005 | Yoo et al. |
| 6,875,534 B2 | 4/2005 | Nakamura et al. |
| 6,884,537 B2 | 4/2005 | Smith |
| 6,942,941 B2 | 9/2005 | Blunk et al. |
| 6,951,623 B2 | 10/2005 | Wu |
| 7,008,584 B2 | 3/2006 | Inoue et al. |
| 2002/0045046 A1 | 4/2002 | Sasaki et al. |
| 2002/0122970 A1 | 9/2002 | Inoue et al. |
| 2003/0054225 A1 | 3/2003 | Kaji et al. |
| 2003/0116185 A1 | 6/2003 | Oswald |
| 2004/0161667 A1 | 8/2004 | Fukuzawa et al. |
| 2005/0263246 A1 | 12/2005 | Yandrasits et al. |
| 2009/0000732 A1 * | 1/2009 | Jacobine et al. ......... 156/273.5 |

FOREIGN PATENT DOCUMENTS

| | | |
|---|---|---|
| EP | 1059308 A1 | 12/2000 |
| JP | 06/279691 | 10/1994 |
| KR | 2002-0091781 A | 12/2002 |
| KR | 2005-0118047 A | 12/2005 |
| WO | WO99/04446 | 1/1999 |
| WO | WO 00/24066 | 4/2000 |
| WO | WO 02/17422 | 2/2002 |
| WO | WO02/093672 | 11/2002 |
| WO | WO2004/047212 | 6/2004 |
| WO | WO2004/061338 | 7/2004 |
| WO | WO2004/079839 | 9/2004 |
| WO | WO2004/107476 | 12/2004 |
| WO | WO2005/074060 | 8/2005 |
| WO | WO2005/078839 | 8/2005 |
| WO | WO2007/084561 | 7/2007 |

* cited by examiner

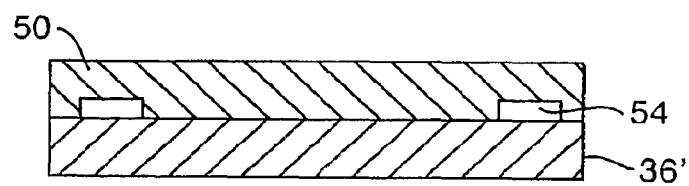
FIG. 6
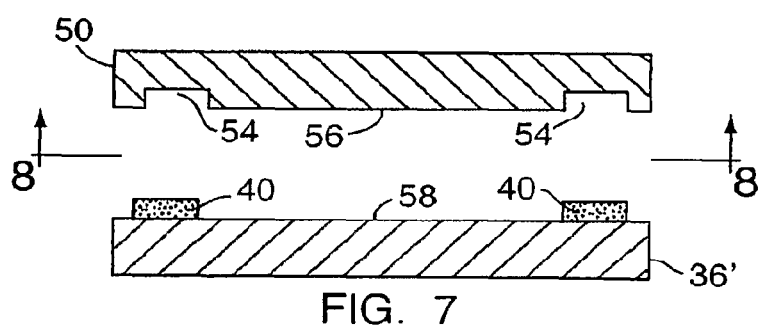
FIG. 7
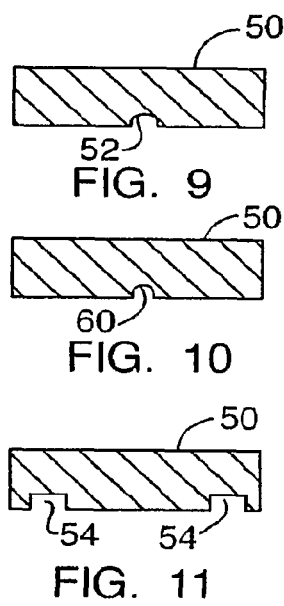
FIG. 9
FIG. 10
FIG. 11
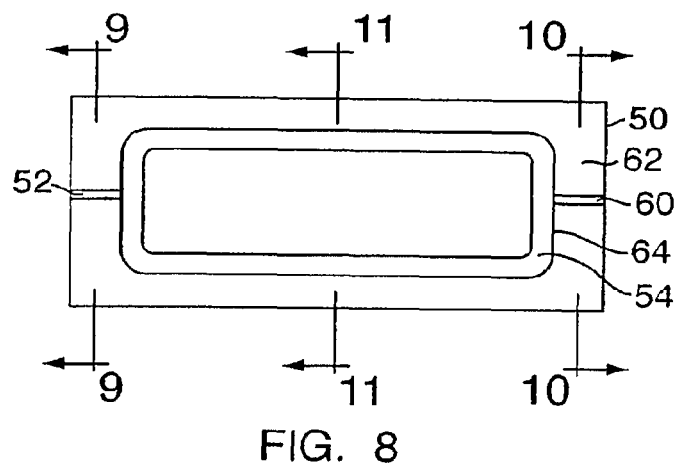
FIG. 8

SEALANT INTEGRATED FUEL CELL COMPONENTS AND METHODS AND SYSTEMS FOR PRODUCING THE SAME

FIELD OF THE INVENTION

The present invention relates to a method and a composition for bonding and sealing components of an electrochemical cell, such as a fuel cell, and an electrochemical cell formed therefrom. More particularly, the present invention relates to a composition, method and design for making an integrated, molded seal on a fuel cell membrane electrode assembly using a liquid sealant.

BRIEF DESCRIPTION OF RELATED TECHNOLOGY

Although there are various known types of electrochemical cells, one common type is a fuel cell, such as a proton exchange membrane ("PEM") fuel cell. The PEM fuel cell contains a membrane electrode assembly ("MEA") provided between two flow field plates or bipolar plates. Gaskets are used between the bipolar plates and the MEA to provide seals thereat. Additionally, since an individual PEM fuel cell typically provides relatively low voltage or power, multiple PEM fuel cells are stacked to increase the overall electrical output of the resulting fuel cell assembly. Sealing is also required between the individual PEM fuel cells. Moreover, cooling plates are also typically provided to control temperature within the fuel cell. Such plates are also sealed to prevent leakage within the fuel cell assembly. After assembling the fuel cell stack is clamped to secure the assembly.

As described in U.S. Pat. No. 6,057,054, liquid silicone rubbers have been proposed to be molded onto membrane electrode assemblies. Such silicone compositions, however, degrade before the desired operating lifetime of the fuel cell is achieved. Also, such silicone rubbers release materials that contaminate the fuel cell, thereby adversely affecting the performance of the fuel cell. Molding of liquid silicone rubber onto separator plates is also described in U.S. Pat. No. 5,264,299. To increase the operating lifetime, more durable elastomers such as fluoroelastomers, as described in U.S. Pat. No. 6,165,634, and polyolefin hydrocarbons, as described in U.S. Pat. No. 6,159,628, have been proposed to bond the surface of fuel cell components. These compositions, however, do not impregnate porous structures such as the gas diffusion layer. The viscosities of these thermoplastic and fluoroelastomers compositions are also too high for injection molding without damaging the substrate or impregnating the porous structure.

U.S. Patent Application Publication No. US 2005/0263246 A1 describes a method for making an edge-seal on a membrane electrode assembly that impregnates the gas diffusion layer using a thermoplastic film having melting point or a glass transition temperature of about 100° C. Such a method is problematic because the maximum temperature a proton exchange membrane can be exposed to will limit the melt processing temperature. The seal will then limit the upper operating temperature of the fuel cell. For example, proton exchange membranes can typically only be exposed to a maximum temperature of 130° C., while normally operating at a temperature of at least 90° C. Thus, the normal and maximum operating temperatures of fuel cells will be limited by the bonding methods of this disclosure.

U.S. Pat. No. 6,884,537 described the use of rubber gaskets with sealing beads for sealing fuel cell components. The gaskets are secured to the fuel cell components through the use of layers of adhesive to prevent movement or slippage of the gaskets. Similarly, International Patent Publication Nos. WO 20041061338 A1 and WO 2004/079839 A2 describe the use of multi-piece and single-piece gaskets for sealing fuel cell components. The gaskets are secured to the fuel cell components through use of an adhesive. The placement of the adhesives and the gaskets are not only time consuming, but problematic because misalignment may cause leakage and loss of performance of the fuel cell.

U.S. Pat. No. 6,875,534 describes a cured-in-place composition for sealing a periphery of a fuel cell separator plate. The cured-in-place composition includes a polyisobutylene polymer having a terminal allyl radial at each end, an organopolysiloxane, an organohydrogenpolysiloxane having at least two hydrogen atoms each attached to a silicon atom and a platinum catalyst. U.S. Pat. No. 6,451,468 describes a formed-in-place composition for sealing a separator, an electrode or an ion exchange membrane of a fuel cell. The formed-in-place composition includes a linear polyisobutylene perfluoropolyether having a terminal alkenyl group at each end, a cross-linker or hardener having at least two hydrogen atoms each bonded to a silicon atom, and a hydrosilylation catalyst. The cross-linked density and the resultant properties of these compositions are limited by using linear polyisobutylene oligomers having an allyl or alkenyl functionality of two. Functionality of these compositions is modified by varying the hydrosilyl functionality, which limits the properties of the resultant compositions.

International Patent Publication No. WO 2004/047212 A2 describes the use of a foam rubber gasket, a liquid silicone sealant or a solid fluoroplastic for sealing fluid transport layer or a gas diffusion layer of a fuel cell. The use of solid gaskets, i.e., foam rubber and/or solid fluoroplastic tape or film, makes placement of these materials and subsequent alignment of the fuel cell components and gaskets time consuming and problematic.

U.S. Patent Application Publication No. 2003/0054225 describes the use of rotary equipment, such as drums or rollers, for applying electrode material to fuel cell electrodes. While this publication describes an automated process for forming fuel cell electrodes, the publication fails to address the sealing concerns of the formed fuel cells.

Despite the state of the art, there remains a need for a sealant composition suitable for use with electrochemical cell components, desirably applied through liquid injection molding.

SUMMARY OF THE INVENTION

In a single cell arrangement, fluid-flow field plates are provided on each of the anode and cathode sides. The plates act as current collectors, provide support for the electrodes, provide access channels for the fuel and oxidant to the respective anode and cathode surfaces, and provide channels in some fuel cell designs for the removal of water formed during operation of the cell. In multiple cell arrangements, the components are stacked to provide a fuel cell assembly having a multiple of individual fuel cells. Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is usually held together in its assembled state by tie rods and end plates. The stack typically includes manifolds and inlet ports for directing the fuel and the oxidant to the anode and cathode flow field channels.

The central element of the fuel cell is the membrane electrode assembly (MEA) which includes two electrodes (anode, cathode) disposed between gas diffusion layers (GDL's) and an ion-conducting polymer electrolyte. Each electrode layer includes electrochemical catalysts, such as platinum, palladium, ruthenium, and/or nickel. The GDL's are placed on top of the electrodes to facilitate gas transport to and from the electrode materials and conduct electrical current. When supplied with fuel (hydrogen) and oxidant (oxygen), two electrochemical half-cell reactions take place. Hydrogen fed to the anode is oxidized to produce protons and electrons in the presence of a catalyst. The resulting protons are transported in an aqueous environment across the electrolyte to the cathode. Useful electrical energy is harnessed by electrons moving through an external circuit before allowing them to reach the cathode. At the cathode, gaseous oxygen from the air is reduced and combined with the protons and electrons. The overall cell reaction yields one mole of water per mole of hydrogen and half mole of oxygen.

When the fuel cell is assembled, the membrane electrode assembly is compressed between separator plates, typically bipolar or monopolar plates. The plates incorporate flow channels for the reactant gases and may also contain conduits for heat transfer. Accordingly, the present invention provides a method to seal the hydrated reactant gases within the cell. The first step of this process includes compression molding a liquid sealant onto the edge of the membrane electrode assembly. Desirably, the nonconductive sealant penetrates the gas diffusion layers to prevent electrical shorting within the fuel cell. The result of the molding process provides a membrane electrode assembly with an edge seal, which can be easily handled. Once provided, the molded membrane electrode assembly can be placed in conjunction with the separator plates to provide a unit cell. A fuel cell stack typically consists of a plurality of unit cells.

According to an aspect of the present invention, a one-part, heat-curable hydrocarbon sealant may be used in a liquid injection molding process. The sealant has a pumpable viscosity in its uncured state to allow it to assume the shape of the mold. The sealant may include of an allyl-terminated hydrocarbon, a reactive diluent, an organosilylhydride, an inhibitor and a catalyst. The reactive diluent may be monofunctional, difunctional, trifunctional, or multifunctional to effect the crosslink density of the cured seal. The appropriate amount of catalyst and inhibitor was chosen to cure the sealant at elevated temperature. Typical curing temperatures are within the range of 50° C. to 200° C. The curing temperature is desirably chosen to fully cure the sealant in a timely fashion and to be compatible with the membrane. For instance, a typical perfluorosulfonic acid PEM cannot be heated above 130° C. In the molding process according to the present invention, the membrane along with electrodes and GDL's was placed into the mold of the injection molder and clamped closed. The one-part hydrocarbon sealant was injected into the heated mold, or die, at the appropriate temperature and cured to provide an edge seal to the MEA.

The hydrocarbon sealant material provides several advantages over other typical sealing and gasketing materials, such as silicones, ethylene propylene diene monomer (EPDM) rubber and fluoroelastomers. Silicones are typically not stable for long times in the aggressive acidic and thermal conditions of a fuel cell, and do not provide the necessary sensitivity to organic contaminants. EPDM rubbers do not provide the necessary impregnation to the gas diffusion layers to prevent electrical shorting once assembled in the fuel cell. Fluoroelastomers are generally costly and need to be cured above the degradation temperature of the proton exchange membrane.

The molded MEA design of the present invention offers several advantages over other seal configurations. By injection molding the seal directly onto the five-layer MEA, an edge seal is provided to prevent reactant gases from leaking out of the MEA. The cured seal provides a method to hold the subsequent parts of the MEA (PEM, electrodes, GDL's) together. The sealant impregnates the GDL's during the injection molding process. This improves the adhesion of the seal to the MEA, and prevents the GDL's from touching, which would result in a short circuit. The one-step sealing process reduces the assembly time and number of seals in the fuel cell stack.

In one aspect of the present invention, a liquid injection molded sealant may be used to impregnate a gas diffusion layer of a membrane electrode assembly and polymerized to create a seal along the edge of the membrane electrode assembly so that the membrane electrode assembly can operate at temperatures above the application temperature of the sealant. The normal operating temperature of a proton exchange membrane (PEM) fuel cell is about 90° C. The upper temperature limit of a typical membrane electrode assembly (MEA) is about 130° C. Accordingly, known thermoplastic sealants are taught to be processed in the temperature range between 90° C. and 130° C. The thermoplastic sealant should not melt below 90° C. because otherwise it will flow when the fuel cell is operating. Further, the processing temperature of the thermoplastic cannot be increased above 130° C. to get faster manufacturing times because the MEA will degrade. In one aspect of the present invention, the use of a thermoset sealant is advantageous. The thermoset sealant can flow into a mold and/or parts of the MEA, i.e., GDL's, at a low temperature and cure in the temperature range between 90° C. and 130° C. to provide a crosslinked material which is stable not only at the fuel cell operating temperature, but also stable at temperatures far above the normal operating temperature. Useful compositions may include functional hydrocarbon and functional fluoro-containing polymers.

In another aspect of the present invention, a curable hydrocarbon sealant is used in a liquid injection molding process. The sealant may include a functional hydrocarbon, a reactive diluent, an organosilylhydride, an inhibitor and a catalyst. The amount of catalyst and inhibitor is desirably chosen to cure the sealant at about 130° C. or below within a short period of time, for example about fifteen minutes or less. In the molding process, the sealant may be injected directly onto the membrane electrode assembly via a mold or die at the appropriate temperature and cured to provide an edge seal to the membrane electrode assembly.

In another aspect of the present invention, a polymer composition is injected into a mold or die that is transparent or transmissive to a specific electromagnetic radiation, for example, ultraviolet light. The composition is injected and exposed to the electromagnetic radiation of a given wavelength through the die and polymerized to forming a seal.

In another aspect of the present invention, a b-staged composition may be melt impregnated into the membrane electrode assembly and polymerized to provide a functional seal.

In one aspect of the present invention, a method for forming a fuel cell includes providing a membrane electrode assembly including a gas diffusion layer; providing a mold having a cavity; positioning the mold so that the cavity is in fluid communication with the membrane electrode assembly; applying a curable liquid sealant composition into the cavity; and curing the composition. The step of applying the sealant may further include the step of applying pressure to the sealant so that the sealant penetrates the gas diffusion layer and/or applying the sealant so that edge of the membrane electrode assembly is fully covered with the sealant. The step of curing the composition may further include thermally curing the sealant at a temperature of about 130° C. or less, desirably at a temperature of about 100° C. or less, more desirably at a temperature of about 90° C. or less. A useful heat curable sealant composition includes an alkenyl terminated hydrocarbon oligomer; a polyfunctional alkenyl monomer; a silyl hardener having at least about two silicon hydride functional groups; and a hydrosilylation catalyst. Desirably, the alkenyl terminated hydrocarbon oligomer includes an alkenyl terminated polyisobutylene oligomer.

The step of curing the composition may also include curing the sealant at about room temperature. The step may include the step of providing actinic radiation to cure the sealant at about room temperature. Desirably, the curable sealant composition includes an actinic radiation curable material selected from the group consisting of acrylate, urethane, polyether, polyolefin, polyester, copolymers thereof and combinations thereof.

In another aspect of the present invention, a system for forming a fuel cell includes first and second mold members having opposed mating surfaces, where at least one of the mating surfaces has a cavity in the shape of a gasket and a port in fluid communication with the cavity and where at least one of the mold members transmits actinic radiation therethrough; and a source of actinic radiation, the actinic radiation generated therefrom being transmittable to the cavity when the opposed mating surfaces are disposed in substantial abutting relationship. Desirably, a fuel cell component is securably placeable between the first and second mold members where the cavity is in fluid communications with the fuel cell component. Alternatively, one of the mold members may be a fuel cell component, such as a membrane electrode assembly, onto which a cured-in-place gasket may be formed to provide an integral gasket thereon.

In another aspect of the present invention, a system for forming a fuel cell includes first and second mold members having opposed mating surfaces, where at least one of the mating surfaces has a cavity in the shape of a gasket and a port in fluid communication with the cavity and where at least one of the mold members is heatable to so that thermal energy transmittable to the cavity when the opposed mating surfaces are disposed in substantial abutting relationship. Desirably, a fuel cell component is securably placeable between the first and second mold members where the cavity is in fluid communications with the fuel cell component. Alternatively, one of the mold members may be a fuel cell component, such as a membrane electrode assembly, onto which a cured-in-place gasket may be formed to provide an integral gasket thereon.

In another aspect of the present invention, an electrode membrane assembly having a cured sealant composition disposed over peripheral portions of the assembly is provided, where the cured sealant composition includes an alkenyl terminated diallyl polyisobutylene oligomer; a silyl hardener having at least about two silicon hydride functional groups where only about one hydrogen atom is bonded to a silicon atom; and a hydrosilylation catalyst. The cured composition may further include a polyfunctional alkenyl monomer.

In another aspect of the present invention, a membrane electrode assembly having a cured sealant composition disposed over peripheral portions of the assembly is provided, where the cured sealant composition includes an actinic radiation curable material selected from the group consisting of acrylate, urethane, polyether, polyolefin, polyester, copolymers thereof and combinations thereof.

BRIEF DESCRIPTION OF THE DRAWINGS

FIG. 6 is a cross-sectional view of the mold of FIG. 5 taken along the 6-6 axis.

FIG. 7 is an exploded view of the mold of FIG. 6 depicting the top mold member and the bottom mold member.

FIG. 8 is a bottom view of the top mold member of FIG. 7 taken along the 8-8 axis.

FIG. 9 is a left elevational view of the top mold member of FIG. 8 taken along the 9-9 axis.

FIG. 10 is a right elevational view of the top mold member of FIG. 8 taken along the 10-10 axis.

FIG. 11a cross-sectional view of the top mold member of FIG. 8 taken along the 11-11 axis.

DETAILED DESCRIPTION OF THE INVENTION

The present invention is directed to a method for bonding and compositions for bonding components of an electrochemical cell. As used herein, an electrochemical cell is a device which produces electricity from chemical sources, including but not limited to chemical reactions and chemical combustion. Useful electrochemical cells include fuel cells, dry cells, wet cells and the like. A fuel cell, which is described in greater detail below, produces electricity from chemical reactants. A wet cell has a liquid electrolyte. A dry cell has an electrolyte absorbed in a porous medium or otherwise restrained from being flowable.

Figure 1:
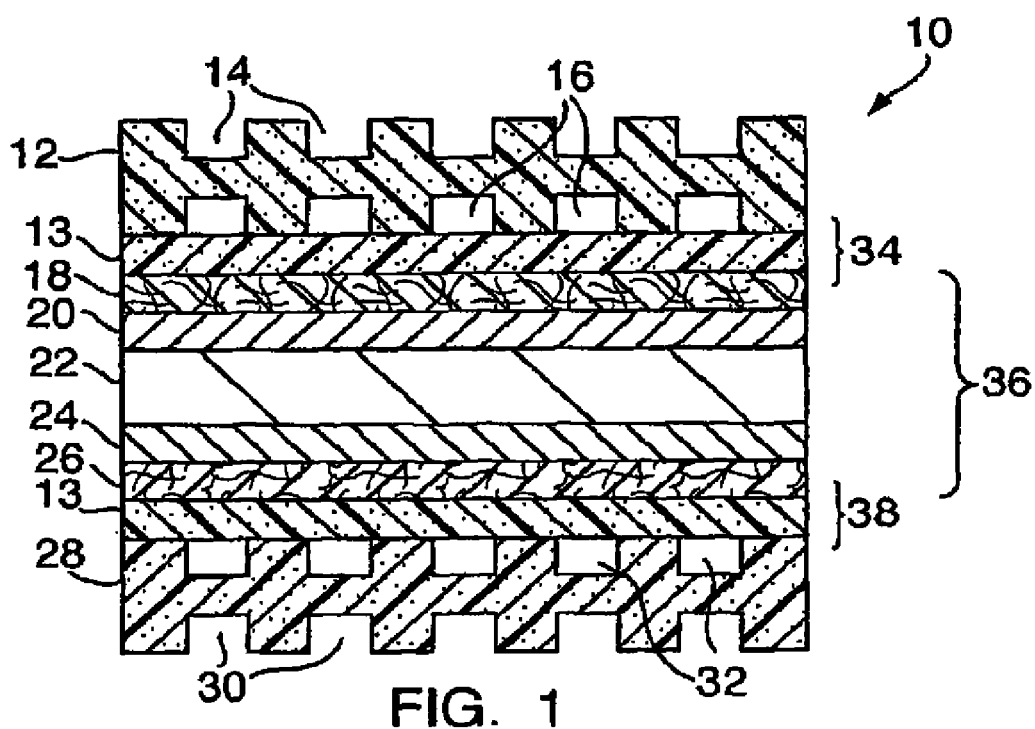
FIG. 1 is a cross-sectional view of a fuel cell having an anode flow field plate, a gas diffusion layer, an anode catalyst, a proton exchange membrane, a cathode catalyst, a second gas diffusion layer, and a cathode flow field plate.

FIG. 1 shows a cross-sectional view of the basic elements of an electrochemical fuel cell, such as fuel cell 10. Electrochemical fuel cells convert fuel and oxidant to electricity and reaction product. Fuel cell 10 consists of an anode flow field plate 12 with open face coolant channels 14 on one side and anode flow channels 16 on the second side, a resin plate 13, a gas diffusion layer 18, an anode catalyst 20, a proton exchange membrane 22, a cathode catalyst 24, a second gas diffusion layer 26, a second resin plate 13 and a cathode flow field plate 28 with open face coolant channels 30 on one side and cathode flow channels 32 on the second side, interrelated as shown in FIG. 1. The gas diffusion layer 18, the anode catalyst 20, the proton exchange membrane 22, the cathode catalyst 24 and the second gas diffusion layer 26 combination is often referred to as a membrane electrode assembly 36. Gas diffusion layers 18 and 26 are typically formed of porous, electrically conductive sheet material, such as carbon fiber paper. The present invention is not, however, limited to the use of carbon fiber paper and other materials may suitably be used. Fuel cells are not, however, limited to such a depicted arrangement of components. The anode and cathode catalyst layers 20 and 24 are typically in the form of finely comminuted platinum. The anode 34 and cathode 38 are electrically coupled (not shown) to provide a path for conducting electrons between the electrodes to an external load (not shown). The flow field plates 12 and 28 are typically formed of graphite impregnated plastic, compressed and exfoliated graphite; porous graphite; stainless steel or other graphite composites. The plates may be treated to effect surface properties, such as surface wetting, or may be untreated. The present invention is not, however, limited to the use of such materials for use as the flow field plates and other materials may suitably be used. For example, in some fuel cells the flow field plates are made from a metal or metal containing material, typically, but not limited to, stainless steel. The flow field plates may be bipolar plates, i.e., a plate having flow channels on opposed plate surfaces, as depicted in FIG. 1. Alternatively, the bipolar plates may be made by securing monopolar plates together.

Some fuel cell designs utilize resin frames 13 between the membrane electrode assembly 36 and the separator plates 12, 28 to improve the durability of the membrane electrode assembly 36 and afford the correct spacing between the membrane electrode assembly 36 and separator plates 12, 28 during fuel cell assembly. In such a design, it is necessary have a seal between the separator plates 12, 28 and the resin frames 13.

The present invention is not limited to the fuel cell components and their arrangement depicted in FIG. 1. For example, a direct methanol fuel cell ("DMFC") can consist of the same components shown in FIG. 1 less the coolant channels. Further, the fuel cell 10 can be designed with internal or external manifolds (not shown).

While this invention has been described in terms of a proton exchange membrane (PEM) fuel cell, it should be appreciated that the invention is applicable to any type of fuel cell. The concepts in this invention can be applied to phosphoric acid fuel cells, alkaline fuel cells, higher temperature fuel cells such as solid oxide fuel cells and molten carbonate fuel cells, and other electrochemical devices.

At anode 34, a fuel (not shown) traveling through the anode flow channels 16 permeates the gas diffusion layer 18 and reacts at the anode catalyst layer 20 to form hydrogen cations (protons), which migrate through the proton exchange membrane 22 to cathode 38. The proton exchange membrane 22 facilitates the migration of hydrogen ions from the anode 34 to the cathode 38. In addition to conducting hydrogen ions, the proton exchange membrane 22 isolates the hydrogen-containing fuel stream from the oxygen-containing oxidant stream.

At the cathode 38, oxygen-containing gas, such as air or substantially pure oxygen, reacts with the cations or hydrogen ions that have crossed the proton exchange membrane 22 to form liquid water as the reaction product. The anode and cathode reactions in hydrogen/oxygen fuel cells are shown in the following equations:

Anode reaction: $H_2 \rightarrow 2H^+ + 2e^-$ (I)

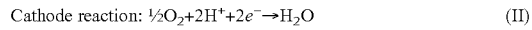

Cathode reaction: $\frac{1}{2}O_2 + 2H^+ + 2e^- \rightarrow H_2O$ (II)

Figure 2:
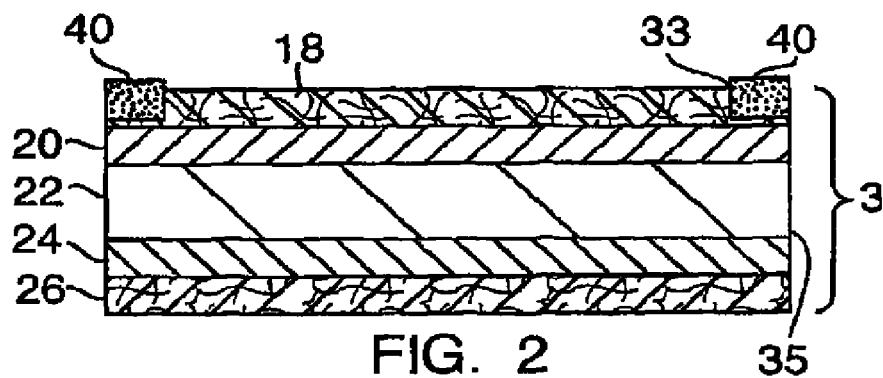
FIG. 2 is a cross-sectional view of a membrane electrode assembly for a fuel cell having a sealant disposed at a peripheral portion of the assembly.

FIG. 2 depicts the membrane electrode assembly 36 having a cured or curable composition 40 at or near the peripheral portion 33 of the membrane electrode assembly 36. As described below, the composition 40 is useful for sealing and/or bonding different components of the fuel cell to one and the other.

Figure 3:
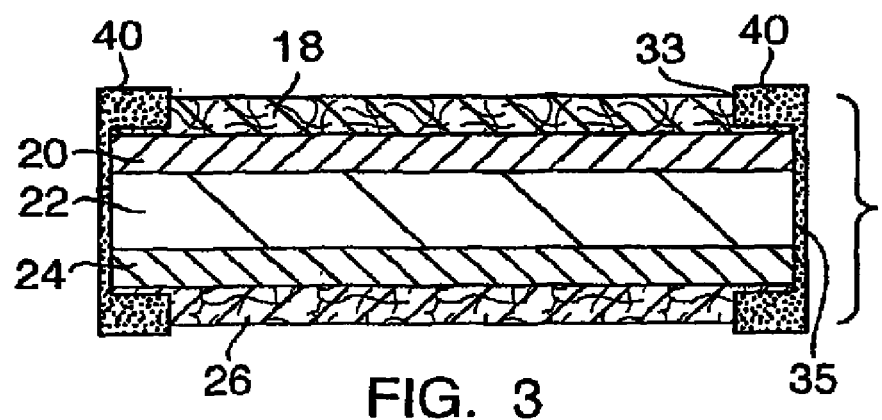
FIG. 3 is a cross-sectional view of a membrane electrode assembly for a fuel cell having a sealant disposed at a peripheral portion and over the peripheral edge portion of the assembly.

The present invention, however, is not limited to having fuel cell components, such as or the membrane electrode assembly 36, with the composition 40 at or near the peripheral portion 33 of the membrane electrode assembly 36. For example, as depicted in FIG. 3, the curable or curable composition 40 may be disposed at or near the peripheral portion 33 of the membrane electrode assembly 36 and cover peripheral edge portions 35 of the membrane electrode assembly 36.

Figure 4:
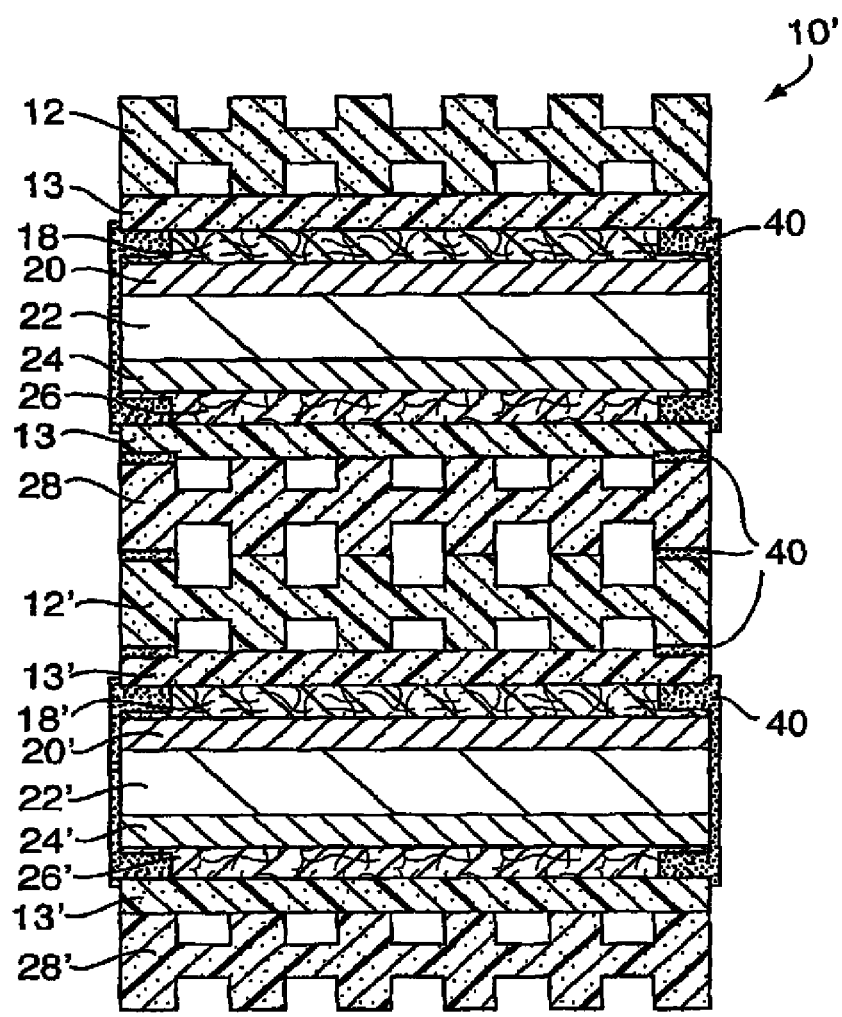
FIG. 4 is a cross-sectional view of a fuel cell having a sealant disposed between the membrane electrode assembly and the flow field plates of a fuel cell to form a stacked fuel cell assembly.

FIG. 4 shows a cross-sectional view of the basic elements of fuel cell 10 in which certain of the adjacent elements have a cured or curable composition 40 therebetween to provide a fuel assembly 10'. As depicted in FIG. 4, composition 40 seals and/or bonds the anode flow field plate 12 to the gas diffusion layer 18 or the membrane electrode assembly 36. The cathode field plate 28 is also sealed and/or bonded to the gas diffusion layer 26 or the membrane electrode assembly 36. In this embodiment, fuel cell assembly 10' often has a preformed membrane electrode assembly 36 anode with the anode catalyst 20 and the cathode catalyst 24 disposed thereon. The composition 40 disposed between the various components of the fuel cell assembly 10' may be the same composition or may be different compositions. Additionally, as depicted in FIG. 4, composition 40 may seal and/or bond the cathode flow plate 28 to a component of a second fuel cell, such as a second anode flow field plate 12'. Further, as depicted in FIG. 4, composition 40 may seal and/or bond the second anode flow field plate 12' to a component of a second fuel cell, such as a second membrane electrode assembly 36'. In such a manner, the fuel cell assembly 10' is formed of multiple fuel cells having components sealingly and/or adhesively adjoined to provide a multiple cell electrochemical device.

Figure 5:
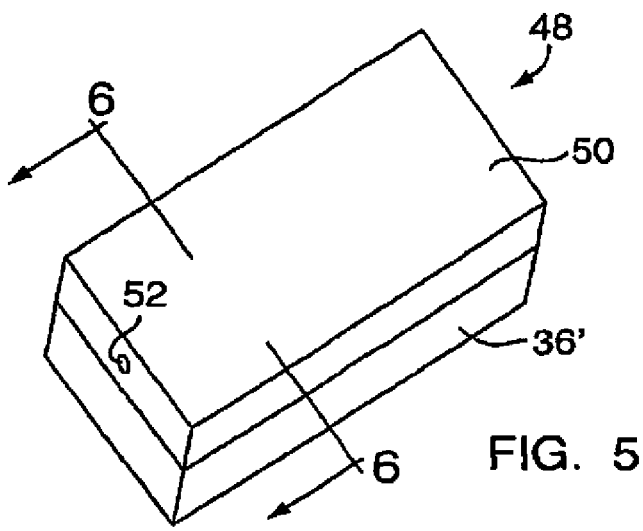
FIG. 5 is a perspective view of a mold having a top and a bottom mold member for forming a gasket in accordance with the present invention.

FIG. 5 is a perspective view of a mold 48 useful for forming cured-in-place gaskets according to the present invention. The mold 48 includes an upper mold member 50, a lower mold member 36', and an injection port 52, inter-related as shown. In this embodiment, composition 40 is disposed onto the lower mold member 36' to form a gasket thereat or thereon. In this embodiment of the present invention, the lower mold member 36' is desirably a fuel cell component, for example membrane electrode assembly 36. The present invention, however, is not limited to the use of the membrane electrode assembly 36 as the bottom mold component, and other fuel cell components may be the bottom mold component. As depicted in FIG. 8, the injection port 52 is in fluid communication with the mold cavity 54.

FIG. 6 is a cross-sectional view of the mold 48 of FIG. 5 taken along the 6-6 axis. As depicted in FIG. 6, the upper mold member 50 includes a mold cavity 54. Liquid gasket-forming compositions may be introduced into the mold cavity 54 via the injection port 52.

FIG. 7 is a partial-break-away view of the mold 48 of FIG. 6. Mold member 50 includes a mating surface 56, and mold member 36' includes a mating surface 58. The mold members 50 and 36' may be aligned to one and the other, as depicted in FIG. 6, such that the mating surfaces 56 and 58 are substantially juxtaposed to one and the other. As depicted in FIG. 7 a gasket 40 is removed from the mold cavity 54 and is attached to the mating surface 58.

As depicted in FIG. 8, the mold cavity 54 is in the shape of a closed perimetric design. Although mold cavity 54 is depicted as a rounded rectangle in FIG. 8, the present invention is not so limited and other shaped cavities may suitably be used. Further, while the cross-sectional shape of the mold cavity 54 is depicted as being rectangular or square in FIG. 7, the present invention is not so limited and other cross-sectional shapes may suitably be used, such as circular, oval, or shaped geometries having extensions for improved sealing.

As depicted in FIG. 8, the mold 50 may contain a second port 60. The second port 60 is in fluid communication with the mold cavity 54. The second port 60 may be used to degas the cavity 54 as it is being filled with the gasket-forming material. As the gasket-forming material in introduced into the cavity 54 via the port 52, air may escape via the second port 60 to degas the mold cavity 54. The size of the second port 60 is not limiting to the present invention. Desirably, the size, i.e., the cross-section extent, of the second port 60 is minimized to allow for the egress of air, but small enough to limit liquid flow of the gasket-forming material therethrough. In other words, the size of the second port 60 may be pin-hole sized where air can flow through while inhibiting substantial flow of liquid gasket-forming material. Further, the present invention is not limited to the use of a single port 52 or a single port 60, and multiple ports may be used for the introduction of the gasket material and/or the venting of air.

FIG. 9 is a cross-sectional view of the mold member 50 taken along the 9-9 axis of FIG. 8. As depicted in FIG. 9, the injection port 52 may suitably be a cavity or bore in the mold member 50. The portion of the injection port 52 may be threaded (not shown) or have a valve (not shown) or a tubing or a hose (not shown) through which the gasket-forming material may be delivered.

FIG. 10 is a cross-sectional view of the mold member 50 taken along the 10-10 axis of FIG. 8. As depicted in FIG. 10, the port 60 may suitably be a cavity or bore in the mold member 50. The portion of the port 60 may have a valve (not shown) for controlling the egress of air and/or gasket-forming material.

FIG. 11 is a cross-sectional view of the mold member 50 taken along the 11-11 axis of FIG. 5. The mold cavity 54 is depicted as extending into the mold member 50 at its mating surface 56.

Figure 12:
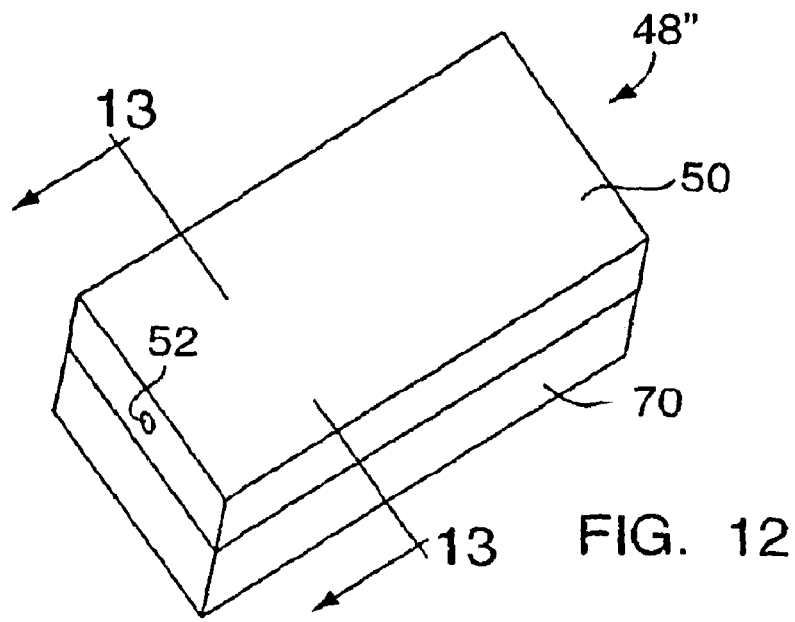
FIG. 12 is a perspective view of an alternative molds according to the present invention.
Figure 13A:
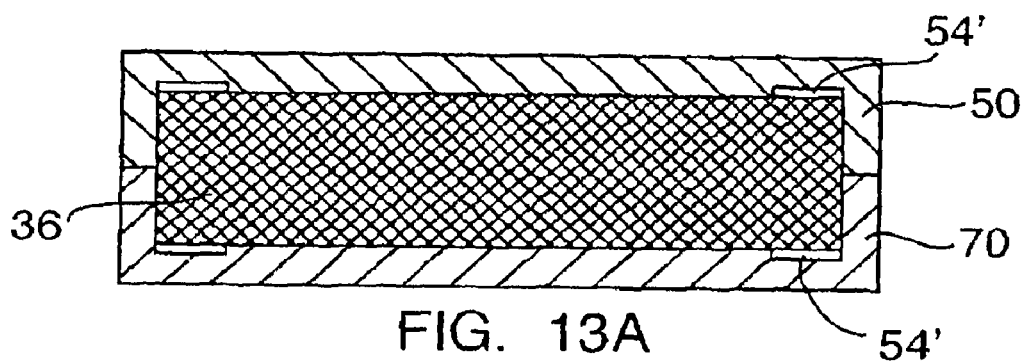
FIGS. 13A and 13B are cross-sectional views of the mold of FIG. 12 taken along the 13-13 axis showing a fuel cell component disposed within the mold.
Figure 13B:
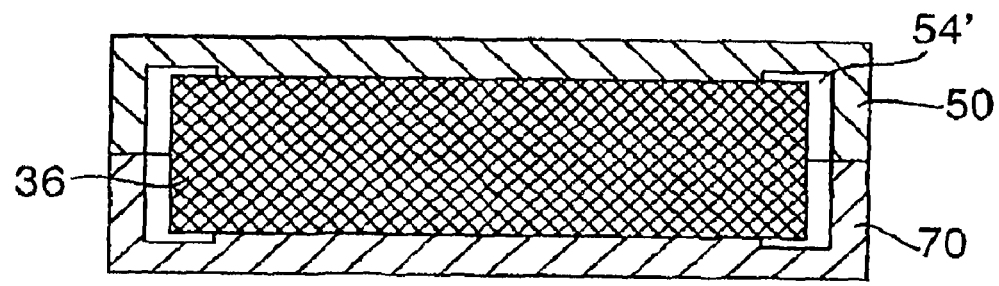

FIG. 12 is a perspective view of a mold 48" useful for forming cured-in-place gaskets according to the present invention. The mold 48" includes an upper mold member 50, a lower mold member 70. As depicted in FIGS. 13A and 13B, the mold members 50 and 70 are fitable together in a fashion as discussed above and are configured such that a fuel cell component, such as membrane electrode assembly 36 may be disposed therebetween. As depicted in FIG. 13A, the mold 48" of the present invention may be used to form the gasket 40 on peripheral portions of the opposed sides of the fuel cell component 36. As depicted in FIG. 13B, the mold 48" of the present invention may also be used to form the gasket 40 on opposed sides and over the peripheral sides of the fuel cell component 36.

Figure 14:
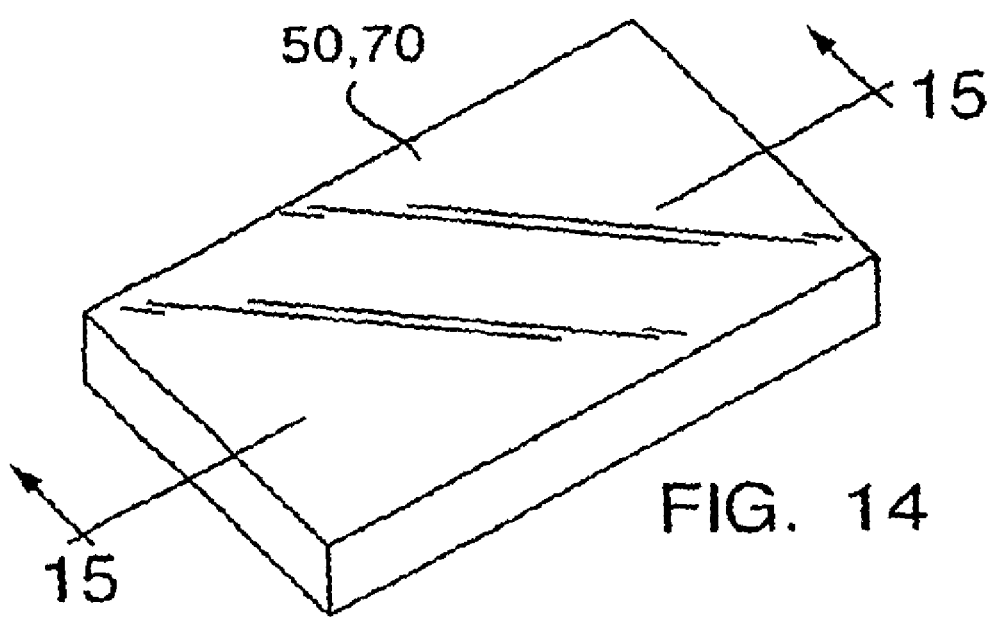
FIG. 14 is a perspective view of the top mold member of FIG. 5 or 12 depicting the top mold member having transparent material.
Figure 15:
FIG. 15 is a cross-sectional view of the transparent top mold member of FIG. 14 taken along the 15-15 axis.

FIG. 14 is a perspective view of the mold member 50, 70 depicting that the mold member 50, 70 may be made of or may comprise a transparent material. Desirably, the mold member 50, 70 is transparent, i.e., transmissible or substantially transmissible, to actinic radiation, for example ultraviolet (UV) radiation. A cross-sectional view of the transparent mold member 50, 70 is depicted in FIG. 15.

The method of this aspect of the present invention may further include the step of degassing the cavity prior to injecting or while injecting the liquid, actinic radiation curable, gasket-forming composition. Desirably, the step of degassing includes degassing through the second port 60, which is in fluid communication with the cavity 54.

With the degassing of the cavity 54 and with the above-described fluid properties the liquid composition fully fills the cavity 54 without the need for excessive liquid handling pressures. Desirably, the liquid composition fully fills the cavity 54 at a fluid handling pressure of about 690 kPa (100 psig) or less.

After the composition is cured or at least partially cured, the mold members 50, 36' or 50, 70 may be released from one and the other to expose the gasket, after which the gasket 40 may be removed from the mold cavity 54. The gasket 40 is desirably disposed and/or affixed to the fuel cell component, for example membrane electrode assembly 36.

Although the present invention has been described as top mold members 50, 70 as having a groove or mold cavity 54, the present invention is not so limited. For example, the bottom mold member 36', 70 and/or the fuel cell component, such as membrane exchange membrane 36, may have a groove or mold cavity for placement and formation of the seal in addition to or in replacement to the mold cavity 54 of the top mold members.

Desirably, the liquid composition is cured at or about room temperature within about 5 minutes or less. More desirably, the liquid composition is cured within 1 minute or less, for example, cured within 30 seconds or less.

In another aspect of the present invention, a curable sealant may be used in a liquid injection molding process. The separator plates and resin frames may be stacked and aligned in the mold. The components are stacked from bottom to top in the order of cathode resin frame, cathode separator, anode separator, and anode resin frame, for example. These fuel cell components may contain one or more continuous pathways or gates that allow the sealant to pass through each component and bond the components while providing a molded seal at the top, bottom and/or on the edge. The sealant has a pumpable viscosity in its uncured state to allow it to assume the shape of the mold. The curable sealant is injected into the heated mold, or die, at an appropriate temperature to bond and seal fuel cell components.

In another aspect of the present invention, a curable sealant is used in a liquid injection molding process. The two separator plates are stacked and aligned in the mold so that the coolant pathway sides of the separators are facing each other. The separators may contain one or more continuous pathways that allow the sealant to bond each component while providing a molded seal at each end and/or on the edge. The sealant has a pumpable viscosity in its uncured state to allow it to assume the shape of the mold. The curable sealant is injected into the heated mold, or die, at the appropriate temperature to bond and seal the separators. In the case where there is no continuous pathway, an edge-sealed bipolar plate is produced.

In another aspect of the present invention, a curable sealant is used in a liquid injection molding process. A fuel cell component such as a resin frame, which may have one or more gates or holes, is placed in a mold, or die. The sealant has a pumpable viscosity in its uncured state to allow it to assume the shape of the mold. The sealant is injected into the heated mold, or die, at the appropriate temperature to cure the sealant. A resin frame with integrated seals on both sides, and possibly the edge, is provided.

It is also envisioned that selected components may be bonded in another process, then proceed to the method described in this invention to be bonded and sealed. As an example, an MEA and a bonded assembly are stacked and aligned in a molding process. The bonded assembly may be composed of the resin frames and separators, as an example. The MEA and the bonded assembly may contain one or more continuous pathways that allow the sealant to bond each component while providing a molded seal at each end and/or on the edge. The sealant has a pumpable viscosity in its uncured state to allow it to assume the shape of the mold. The curable sealant is injected into the heated mold, or die, at the appropriate temperature to bond and seal the separators.

In one aspect of the present invention, the cured sealant composition used in the present invention includes an alkenyl terminated polyisobutylene oligomer, for example an alkenyl terminated diallyl polyisobutylene oligomer; optionally, a polyfunctional alkenyl monomer; a silyl hardener or cross-linker having at least one hydrogen atom bonded to a silicon atom; and a hydrosilylation catalyst. Desirably, only about one hydrogen atom bonded is to any silicon atom in the silyl hardener.

The inventive compositions of the present invention have modified molecular structures, resulting in enhanced mechanical properties, cross-link densities and heats of reaction. The compositions of the present invention may be represented by the expression of $(A-A+A_f+B_f)$, where "A-A" represents the alkenyl groups of the alkenyl terminated diallyl polyisobutylene oligomer, i.e., a difunctional alkenyl polyisobutylene ("PIB"), "A" represents an alkenyl group, "B" represents a Si—H group and "f" refers to the number of corresponding functional groups.

When both the alkenyl and hydride are di-functional, the polymerization yields a linear structure. The number of functional hydride groups in such a linear structure, however, limits the overall functionality and cross-linked density of the reacted network. By incorporating three or more alkenyl groups onto a single monomer or oligomer the cross-linking density increases and mechanical properties are improved.

Useful dialkenyl terminated linear poly(isobutylene) oligomers are commercially available from Kaneka Corporation, Osaka, Japan as EP200A, EP400A and EP600A. The three oligomers have the same functionality and have different molecular weights. EP200A, EP400A and EP600A have an approximate molecular weight (Mn) of 5,000, 10,000, and 20,000, respectively.

The compositions of the present invention may also include a silicone having at least two reactive silicon hydride functional groups, i.e., at least two Si—H groups. This component functions as a hardener or cross-linker for the alkenyl terminated diallyl polyisobutylene oligomer. In the presence of the hydrosilation catalyst, the silicon-bonded hydrogen atoms in the cross-linking component undergo an addition reaction, which is referred to as hydrosilation, with the unsaturated groups in the reactive oligomer. Since the reactive oligomer contains at least two unsaturated groups, the silicone cross-linking component may desirably contain at least two silicon-bonded hydrogen atoms to achieve the final cross-linked structure in the cured product. The silicon-bonded organic groups present in the silicone cross-linking component may be selected from the same group of substituted and unsubstituted monovalent hydrocarbon radicals as set forth above for the reactive silicone component, with the exception that the organic groups in the silicone cross-linker should be substantially free of ethylenic or acetylenic unsaturation. The silicone cross-linker may have a molecular structure that can be straight chained, branched straight chained, cyclic or networked.

The silicone cross-linking component may be selected from a wide variety of compounds, that desirably conforms to the formula below:

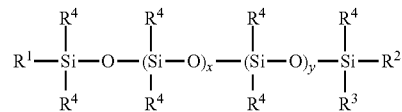

where at least two of $R^1$, $R^2$ and $R^3$ are H; otherwise $R^1$, $R^2$ and $R^3$ can be the same or different and can be a substituted or unsubstituted hydrocarbon radical from $C_{1-20}$ such hydrocarbon radicals including alkyl, alkenyl, aryl, alkoxy, alkenyloxy, aryloxy, (meth)acryl or (meth)acryloxy; thus the SiH group may be terminal, pendent or both; $R^4$ can also be a substituted or unsubstituted hydrocarbon radical from $C_{1-20}$, such hydrocarbon radicals including a $C_{1-20}$ alkyl, alkenyl, aryl, alkoxy, alkenyloxy, aryloxy, (meth)acryl or (meth)acryloxy, and desirably is an alkyl group such as methyl; x is an integer from 10 to 1,000; and y is an integer from 1 to 20. Desirably, $R^2$ and $R^3$ are not both hydrogen, i.e., $R^1$ is H and either $R^2$ or $R^3$, but not both, is H. Desirably, R groups which are not H are methyl. The silicon hydride crosslinker should be present in amounts sufficient to achieve the desired amount of crosslinking and desirably in amounts of about 0.5 to about 40 percent by weight of the composition, more desirably from about 1 to about 20 percent by weight of the composition.

Useful platinum catalysts include platinum or platinum-containing complexes such as the platinum hydrocarbon complexes described in U.S. Pat. Nos. 3,159,601 and 3,159,662; the platinum alcoholate catalysts described in U.S. Pat. No. 3,220,972; the platinum complexes described in U.S. Pat. No. 3,814,730; and the platinum chloride-olefin complexes described in U.S. Pat. No. 3,516,946. All of these U.S. patents relating to platinum or platinum-containing catalysts are hereby expressly incorporated herein by reference. Desirably, the platinum or platinum-containing complex is dicarbonyl platinum cyclovinyl complex, platinum cyclovinyl complex, platinum divinyl complex, or combinations thereof. The platinum catalysts are in sufficient quantity such that the composition cures at a temperature of about 130° C. or less, desirably at a temperature of about 100° C. or less, more desirably at a temperature of about 90° C. or less.

In another aspect of the present invention, the liquid gasket-forming material may include actinic radiation curable acrylates, urethanes, polyethers, polyolefins, polyesters, copolymers thereof and combinations thereof. Desirably, the curable material includes a (meth)acryloyl terminated material having at least two (meth)acryloyl pendant groups. Desirably, the (meth)acryloyl pendant group is represented by the general formula: —OC(O)C($R^1$)=CH$_2$, where $R^1$ is hydrogen or methyl. More desirably, the liquid gasket-forming material is a (meth)acryloyl-terminated poly acrylate. The (meth)acryloyl-terminated poly acrylate may desirably have a molecular weight from about 3,000 to about 40,000, more desirably from about 8,000 to about 15,000. Further, the (meth)acryloyl-terminated poly acrylate may desirably have a viscosity from about 200 Pas (200,000 cPs) to about 800 Pas (800,000 cPs) at 25° C. (77° F.), more desirably from about 450 Pas (450,000 cPs) to about 500 Pas (500,000 cPs). Details of such curable (meth)acryloyl-terminated materials may be found in European Patent Application No. EP 1 059 308 A1 to Nakagawa et al., and are commercially available from Kaneka Corporation, Japan.

Desirably, the liquid composition includes a photoinitiator. A number of photoinitiators may be employed herein to provide the benefits and advantages of the present invention to which reference is made above. Photoinitiators enhance the rapidity of the curing process when the photocurable compositions as a whole are exposed to electromagnetic radiation, such as actinic radiation. Examples of suitable photoinitiators for use herein include, but are not limited to, photoinitiators available commercially from Ciba Specialty Chemicals, under the "IRGACURE" and "DAROCUR" trade names, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE" 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC). Useful actinic radiation includes ultraviolet light, visible light, and combinations thereof. Desirably, the actinic radiation used to cure the liquid gasket-forming material has a wavelength from about 200 nm to about 1,000 nm. Useful UV includes, but is not limited to, UVA (about 320 nm to about 410 nm), UVB (about 290 nm to about 320 nm), UVC (about 220 nm to about 290 nm) and combinations thereof. Useful visible light includes, but is not limited to, blue light, green light, and combinations thereof. Such useful visible lights have a wavelength from about 450 nm to about 550 nm.

Optionally, a release agent may be applied to the cavity 54 prior to the introduction of the liquid composition. The release agent, if needed, helps in the easy removal of the cured gasket from the mold cavity. Useful mold release compositions include, but are not limited to, dry sprays such as polytetrafluoroethylene, and spray-on-oils or wipe-on-oils such as silicone or organic oils. Useful mold release compositions include, but are not limited to, compositions including $C_6$ to $C_{14}$ perfluoroalkyl compounds terminally substituted on at least one end with an organic hydrophilic group, such as betaine, hydroxyl, carboxyl, ammonium salt groups and combinations thereof, which is chemically and/or physically reactive with a metal surface. A variety of mold releases are available, such as those marketed under Henkel's Frekote brand. Additionally, the release agent may be a thermoplastic film, which can be formed in the mold shape.

What is claimed is:

1. A method for forming a fuel cell comprising:
   providing a membrane electrode assembly comprising a gas diffusion layer;
   providing a mold having a cavity;
   positioning the mold so that the cavity is in fluid communication with the membrane electrode assembly;
   applying a curable liquid sealant composition into the cavity;
   curing the composition in the cavity to form a gasket; and
   removing the membrane electrode assembly from the mold and removing the gasket from the cavity.

2. The method of claim 1, wherein the step of applying the sealant further comprises:
   applying pressure to the sealant so that the sealant penetrates the gas diffusion layer.

3. The method of claim 1, wherein the step of applying the sealant further comprises:
   applying the sealant so that an edge of the membrane electrode assembly is fully covered with the sealant.

4. The method of claim 1, wherein, the step of curing the composition comprises:
   thermally curing the sealant at a temperature of about 130° C. or less.

5. The method of claim 1, wherein, the step of curing the composition comprises:
   thermally curing the sealant at a temperature of about 100° C. or less.

6. The method of claim 1, wherein, the step of curing the composition comprises:
   thermally curing the sealant at a temperature of about 90° C. or less.

7. The method of claim 1, wherein, the step of curing the composition comprises:
   curing the sealant at about room temperature.

8. The method of claim 1, wherein the mold is transparent to actinic radiation and the step of curing the composition comprises providing actinic radiation to cure the sealant at about room temperature.

9. The method of claim 1, wherein the curable sealant composition comprises:
   an alkenyl terminated hydrocarbon oligomer;
   a polyfunctional alkenyl monomer;
   a silyl hardener having at least about two silicon hydride functional groups; and
   a hydrosilylation catalyst.

10. The method of claim 9, wherein the alkenyl terminated hydrocarbon oligomer comprises an alkenyl terminated polyisobutylene oligomer.

11. The method of claim 1, wherein the curable sealant composition comprises actinic a radiation curable material selected from the group consisting of acrylate, urethane, polyether, polyolefin, polyester, copolymers thereof and combinations thereof.

12. A system for forming a fuel cell comprising:
   first and second mold members having opposed mating surfaces, wherein at least one of the mold members is reusable and at least one of the mating surfaces has a cavity in the shape of a gasket and a port in fluid communication with the cavity and wherein at least one of the mold members is heatable to so that thermal energy is transmittable to the cavity when the opposed mating surfaces are disposed in substantial abutting relationship.

13. The system of claim 12, wherein one of the mold members is not reusable and comprises a fuel cell component onto which a cured-in-place gasket may be formed to provide an integral gasket thereon.

14. The system of claim 13, wherein the fuel cell component is a membrane electrode assembly.

15. The system of claim 12, wherein the first and second mold members are each reusable and a fuel cell component is securably placeable between the first and second mold members and further wherein the cavity is in fluid communications with the fuel cell component.

16. The system of claim 15, wherein the fuel cell component is a membrane electrode assembly.

* * * * *